(12) United States Patent
Russell et al.

(10) Patent No.: US 6,470,558 B1
(45) Date of Patent: *Oct. 29, 2002

(54) METHOD FOR FACING A SUBSTRATE

(75) Inventors: Mark A. Russell; Frederick B. Russell, both of Sheffield (GB)

(73) Assignee: Cutting and Wear Resistant Developments, Limited, Rotherham (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,260

(22) PCT Filed: Apr. 5, 1995

(86) PCT No.: PCT/EP95/01258

§ 371 (c)(1),
(2), (4) Date: Dec. 17, 1996

(87) PCT Pub. No.: WO95/27588

PCT Pub. Date: Oct. 19, 1995

(30) Foreign Application Priority Data

Apr. 8, 1994 (GB) ............................................... 9407021

(51) Int. Cl.⁷ ............................................... B22D 19/08

(52) U.S. Cl. ........................ 29/460; 175/375; 156/305; 228/175; 228/122.1

(58) Field of Search .................. 29/460, 464; 175/320, 175/374, 375, 425; 428/627, 614; 156/305; 228/175, 212, 122.1

(56) References Cited

U.S. PATENT DOCUMENTS

| 2,411,867 A | * | 12/1946 | Brenner ...................... 428/614 |
| 3,000,094 A | * | 9/1961 | Arnoldy ...................... 29/528 |
| 3,268,274 A | | 8/1966 | Ortloff et al. .................. 308/4 |
| 3,584,181 A | * | 6/1971 | Nemoto ...................... 219/128 |

(List continued on next page.)

FOREIGN PATENT DOCUMENTS

| EP | 0 619 163 A1 | 10/1994 |
| EP | 0 619 163 B1 | 12/1995 |
| GB | 0 571 228 A | 8/1945 |
| GB | 0719016 | 11/1954 |
| GB | 0 732 397 A | 6/1955 |
| GB | 1128880 | 10/1968 |
| GB | 1 180 109 A | 2/1970 |
| GB | 1 234 362 A | 6/1971 |
| GB | 2 035 175 A | 6/1980 |
| GB | 2 081 155 A | 2/1982 |
| GB | 2 112 312 A | 7/1983 |
| GB | 2133062 | 7/1984 |

Primary Examiner—David P. Bryant
Assistant Examiner—Jermie E. Cozart
(74) Attorney, Agent, or Firm—John R Casperson

(57) ABSTRACT

A method of facing a substrate comprises the steps of first welding a body of a hard facing material to the substrate and then filling a space around the body with a molten metal. The method can be used in the hard facing of metal components with, for example, hard facing materials such as tungsten carbide. The substrate can comprise a metal surface, which can, for example, be the surface of any suitable component, tool, or implement subject to wear in use. The method is particularly suitable for hard facing the wear surfaces of components for use in drill strings in down-hole drilling technology, for example, drill stabilizers.

24 Claims, 1 Drawing Sheet

U.S. PATENT DOCUMENTS

| | | | | |
|---|---|---|---|---|
| 3,751,283 A | * | 8/1973 | Dawson | 117/22 |
| 4,043,611 A | * | 8/1977 | Wallace | 175/320 |
| 4,243,727 A | * | 1/1981 | Wisler et al. | 175/374 |
| 4,351,866 A | * | 9/1982 | Mennesson et al. | 428/60 |
| 4,610,320 A | * | 9/1986 | Beakley | 29/527.2 |
| 4,689,463 A | * | 8/1987 | Shubert | 219/76.16 |
| 4,739,146 A | * | 4/1988 | Lindland et al. | 219/76.16 |
| 4,745,035 A | * | 5/1988 | Saurer et al. | 428/614 |
| 4,906,805 A | * | 3/1990 | Rudd | 219/85.11 |
| 4,933,240 A | * | 6/1990 | Barber, Jr. | 428/608 |
| 5,271,547 A | * | 12/1993 | Carlson | 228/122.1 |
| 5,413,016 A | | 5/1995 | Kranz et al. | 76/108.1 |
| 5,516,053 A | * | 5/1996 | Hannu | 241/207 |
| 5,695,825 A | * | 12/1997 | Scruggs | 427/449 |

* cited by examiner

METHOD FOR FACING A SUBSTRATE

CROSS REFERENCE TO RELATED APPLICATIONS

NOT APPLICABLE

STATEMENT REGARDING FEDERALLY SPONSORED RESEARCH OR DEVELOPMENT

NOT APPLICABLE

MICROFICHE APPENDIX

NOT APPLICABLE.

BACKGROUND OF THE INVENTION

1. Field of the Invention

This invention relates to a method for facing a substrate and more particularly to a novel method for applying a hard facing material to a substrate to provide an improved wear resistant or cutting surface.

It is known to apply hard facing materials to surfaces of components, tools, and implements subject to wear in order to improve their wear resistant and cutting properties. An example of a hard facing material is tungsten carbide, which, in a known process, is positioned on a metal surface and then fixed in place by means of a metal layer sprayed onto the surface. The tungsten carbide may be in the form of small, irregularly-shaped lumps, or particles, or in the form of small rectangular blocks, sometimes called tips or inserts.

The tungsten carbide blocks are desirably laid in a regular pattern on the metal surface, but hitherto it has proved extremely difficult to hold the blocks in place whilst the sprayed metal layer is applied, particularly when the underlying metal substrate surface is curved such as, for example, when applying a hard facing material to a stabiliser of a drill string of the type used in oil well technology. Hitherto the blocks have been placed in the desired pattern on a sheet of adhesive masking tape and the sheet, with the blocks adhered thereto, is inverted and placed on the pre-heated substrate in the desired position. A molten metal spray, for example of a bronze alloy, is then applied to the surface, burning off the masking tape and fixing the blocks in their desired locations. It is, however, very easy for individual blocks to fall off using this method, and at best there is nearly always some movement of the blocks from their desired positions. The procedure requires great skill, and working conditions are somewhat unpleasant in view of the need to pre-heat the metal substrate to a high temperature so that the spraying process can be carried out quickly, firstly to provide good adhesion and secondly in order to avoid moving or dislodging the blocks during the spraying process.

The following prior art publications are deserving of brief discussion.

2. Description of Related Art

In United Kingdom Application GB2133062, published Oct. 2, 1968, the entire disclosure of which is incorporated herein by reference, there is described a method of providing a wear surface for the blade of a tool, which comprises the steps of inserting an inlay of hard wearing material into an undercut groove running lengthwise of the blade and heating the mass until the inlay bonds to the groove. The machining of the undercut grooves is of course a very costly and time consuming operation, and the entire tool needs to be placed in an oven at a high temperature to achieve the required bonding, which is wasteful of energy.

In GB1128880, the entire disclosure of which is also incorporated herein by reference, there is described a method of joining a metal tube to a wall, in which the tube is retained in position on the wall by tack welding, and then sprayed with molten aluminium from a gun, such that the fillet area between the arcuate surface of the tube and the wall is filled with solidified molten aluminium. The coating is continuous across the tube and of such a thickness as to serve as the essential heat transfer path from the surface of the wall to the tube. This patent is not concerned in any way with the hard facing of a substrate.

SUMMARY OF THE INVENTION

We have now discovered an improved process for hard facing a substrate which obviates many of the disadvantages of the known procedures. In this improved process, appropriately shaped bodies of the hard material are attached to the substrate and then anchored in position by the application of a molten metal.

In one aspect, the present invention provides a method of facing a substrate, which comprises attaching a body of a facing material to the substrate and filling a space around the body with a molten metal.

The invention can be used to apply a variety of facing materials to a substrate, to produce, for example, knife blades or bearings, but it is more particularly of use in the hard facing of metal components with, for example, hard facing materials such as tungsten carbide. In general, of course, the hard facing material will be harder, and/or more wear resistant, than the substrate to which it is applied. The invention will be principally described herein with reference to such hard facing materials, but it is to be understood that it is not limited thereto, and could, for example, be used to apply facing materials having other useful properties, for example, slip, or frictional characteristics, to a substrate. These and other features, aspects and advantages of the present invention, will become better understood from the following drawings, descriptions and appended claims.

Figure 1:
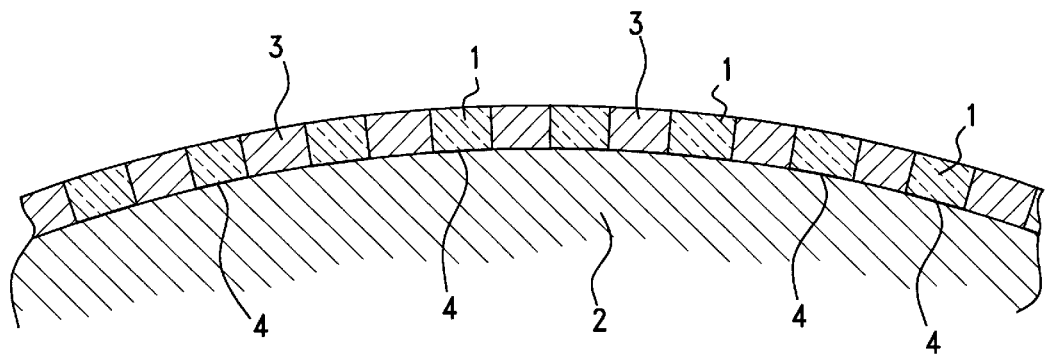
FIG. 1 is a cross-sectional view of bodies welded onto a substrate with a molten metal filled between the bodies.

Preferably both the substrate and the body of facing material are electrically conductive, in order that the body of facing material can be attached to the substrate by an electrical welding method, as will be more particularly described hereinafter. This is not essential however, and, for example, where one or both of the body of facing material and substrate are electrically insulating, for example, a ceramic material.

The substrate will normally comprise a metal surface, which can, for example, be the surface of any suitable component, tool, or implement subject to wear in use. The invention is particularly suitable for hard facing the wear surfaces of components for use in drill strings in down-hole drilling technology, for example, drill stabilisers.

The electrical conductivity of the body of facing material is preferably such that it can conduct an electrical welding current across its thickness under normal electrical welding conditions.

The facing material can be, for example, a hard metal such as an alloy steel, or a bearing material such as Babbit metal, but is preferably a hard material, such as tungsten carbide, having exemplary wear properties. The facing material can be used in the form of particles, or irregularly shaped lumps, but is preferably in the form of shaped blocks, discs, or other regular geometric shapes. The invention is particularly applicable to tungsten carbide blocks, otherwise called tips or inserts, which are preferably rectangular in shape, for example, having width and length dimensions of from 1 to 100 mm and a thickness of from 1 to 20 mm.

According to a preferred aspect of the present invention the body of facing material is attached to the electrically conductive substrate by a welding method, which preferably comprises electrical welding, although friction welding, or ultrasonic welding, may also be used in appropriate circumstances. The welding method can of course be carried out at room temperature and, in the case of electrical welding, simply requires the body of electrically conductive facing material to be placed on the electrically conductive substrate and, for example, the electrode of an electrical-welding machine to be applied to an upper surface of the body. The electric current passing through the body is sufficient to fuse an area of the lower surface of the body to the substrate. Typical electrical welding conditions are, for example, a voltage of about 75 volts and a current of about 5000 amps, although other conventional electrical welding conditions can also be employed as appropriate.

Although the welding method can firmly attach the body of the facing material to the substrate, the bond will in general not be sufficient to withstand the shear forces which it is likely to experience in use. For this reason, in the method of the invention, a space around the body is filled, for example by spraying or depositing a molten metal, in order to anchor the body firmly on the substrate.

It will in general be necessary to use a molten metal, such as, for example, a brazing composition to anchor the body of facing material satisfactorily. Suitable molten metals include metal alloys and brazing compositions such as nickel bronzes, silver solders, soft solders and nickel/chrome/boron alloys.

Figure 2:
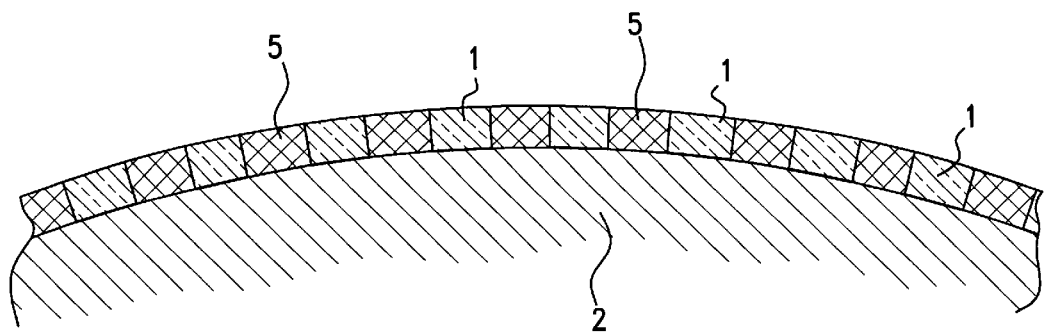
FIG. 2 is a cross-sectional view of bodies positioned on a substrate using a perforated mat or support.
Figure 3:
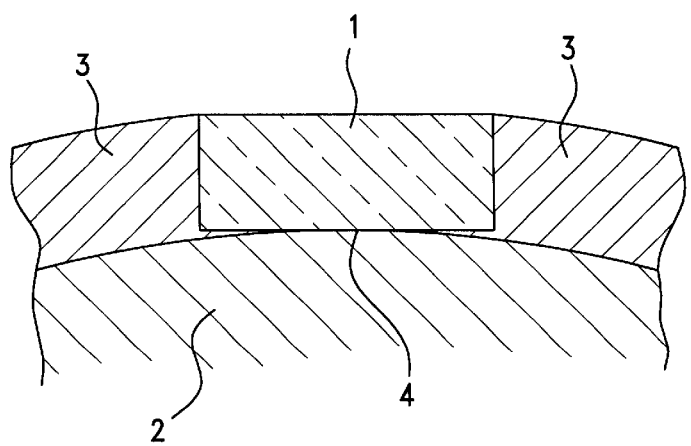
FIG. 3 is a detailed view of a portion of the subject matter shown in FIG. 1.

Although it is possible to apply the bodies of facing material individually to the substrate, in a preferred process according to the invention a number of the bodies are assembled on a perforated mat or support 5, as shown in FIG. 2, having a pattern of holes corresponding to the desired relative positions of the bodies on the substrate. The mat should preferably be formed from an electrically insulating material if a welding attachment method is to be used, and the mat is also, preferably sufficiently flexible to conform to the substrate. Suitable materials for the mat include electrically insulating natural and synthetic rubber compositions, silicone rubbers, and, especially polyurethane rubbers. Preferably the holes are shaped such that the bodies are an interference fit therein so that the bodies can be transported whilst held within the holes in the mat. In this preferred method, the mat with the bodies positioned in the holes is placed on the substrate in the desired location and the bodies attached to the substrate whilst they are firmly held in the desired positions by the mat.

If desired, where an electrical welding method is used, either or both of the surfaces of the electrically conductive substrate and the body of facing material which are to be in contact may be coated, and preferably sprayed, with a thin fusible metal layer prior to the welding step to improve welding adhesion. In the case of the substrate, the metal layer also helps to avoid oxidation of the substrate surface. Metal layers of thickness from 0.1 to 10 mm are generally suitable, and suitable metals include copper based alloys, nickel based alloys and iron based alloys.

After attachment, a space around the body or bodies is filled with a molten metal. In this step, the molten metal is preferably sprayed or coated on to the substrate with the body of facing material attached thereto so that a space around the body or bodies contiguous with the substrate surface is filled with molten metal. If desired, the substrate and body of facing material can be pre-heated to a temperature of from 80° C. to around 150° C. The molten metal is preferably sprayed on since this process is less likely to disrupt the bond between the substrate and the body of facing material but this is not essential and other deposition techniques can be employed. Where the substrate has a curved surface, it may be preferable to use a body having a flat (not curved) lower surface in order that only point contact is made between the substrate and the body, thereby providing an enhanced weld in the welding step. Any voids beneath the body and between the body and the surface of the substrate, or between adjacent bodies, will be filled by sprayed molten metal and the point at which the voids are filled can easily be determined by observing a change in colour of the body during the spraying process. This change is caused by the sudden drop in temperature of the body when the voids are filled thereby providing a heat conducting path such that the substrate acts as a massive heat sink conducting heat away from the body.

The thickness of the layer of molten metal applied to anchor the body of facing material to the substrate will depend of course upon the thickness of the body but it is in general from 0.1 to 10 mm thick. The molten metal can be sprayed or deposited from any suitable spraying or deposition equipment. Preferably the molten metal is applied in a layer which is sufficiently thick to cover the body of facing material completely, although this is not essential in all cases.

After spraying or depositing the layer of molten metal the top surface of the layer can be machined or abraded away if desired to expose the top surface of the body of facing material.

The invention allows a plurality of bodies of facing material to be arranged in a predetermined pattern on the surface of the substrate in order to achieve, for example, optimum wear resistance, or a cutting edge or surface. It is applicable both to the facing of new components and to the refurbishment of worn components.

An embodiment of a method according to the invention will now be more particularly described in the following example:

EXAMPLE

This example describes a method according to the invention for the hard facing of a stabiliser for a drill string.

The drill string stabiliser to be hard faced has a diameter of 30.5 cm. Tungsten carbide blocks of rectangular shape having sides 13 mm by 5 mm and thickness 3 mm are first treated by spraying a principal surface with a 0.25 mm thick layer of nickel/chrome/boron alloy.

The tungsten carbide blocks are then placed, with their sprayed faces downwards, in holes in a perforated mat of polyurethane rubber, the holes being shaped so that the blocks are an interference fit therein. The mat is of rectangular shape, with sides 10 cm by 15 cm, and thickness 3 mm, and is provided with from 10 to 1000 holes for the reception of the tungsten carbide blocks.

The flexible mat is then laid upon the curved surface of the stabiliser whereupon it conforms to the shape thereof, at the same time retaining each of the tungsten carbide blocks in its desired location. The blocks are then each welded to the stabiliser surface using an electrical welding machine, the machine being set to apply a voltage of 75 volts and a current of 5000 amps.

After the blocks have been welded to the stabilizer surface, the mat is removed, the stabilizer heated to 80–150° C. and pre-sprayed with nickel chrome boron alloy to a thickness of 0.25 mm. The stabiliser is then further heated to 250–400° C., and the entire surface is sprayed with nickel chrome boron alloy and fused in at a temperature of 1050° C. until a layer of 3.5 mm has been built up. As the bodies have a flat surface they make only point contact with the curved surface of the stabiliser, thereby improving welding efficiency. The substantially triangular-shaped voids beneath the bodies are filled with molten metal during the fusing in process. As previously mentioned, the end point at which the voids are filled can readily be determined by a change in colour of the tungsten carbide bodies, each turning a deeper red as heat is conducted therefrom to the stabiliser, which acts as a heat sink.

Spraying is discontinued when a layer of 3.5 mm has been built up.

A section through a plurality of tungsten carbide bodies, and a portion of the adjacent stabiliser surface, after the spraying step, is illustrated in FIG. 1 of the accompanying Drawing which shows the tungsten carbide blocks 1, the stabiliser surface 2, the sprayed molten metal 3, and the weld 4.

In a final finishing step, the surface of the sprayed metal layer is abraded to reveal the top surfaces of the tungsten carbide blocks.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings), and/or all of the steps or any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). This invention extends to any novel one, or any novel combination, of the features disclosed in this specification (including any accompanying claims, abstract and drawings), or to any novel one, or any novel combination, of the steps of any method or process so disclosed.

What is claimed is:

1. A method of hard facing a substrate, which comprises the steps of:
   a) first welding a plurality of bodies of a hard facing material to the substrate to define spaces around and between said bodies; and,
   b) then filling said spaces with a molten metal to anchor said plurality of bodies to the substrate, wherein, prior to the welding step, the bodies have a flat surface and make only point contact with a curved surface of the substrate, and, after the welding step, voids remain between the bodies and between the bodies and the substrate which are filled with molten metal to anchor the bodies.

2. A method according to claim 1, in which the substrate comprises a wear surface of a component of a drill string.

3. A method according to claim 1, in which the hard facing material comprises tungsten carbide.

4. A method according to claim 1, in which the hard facing material is in the form of rectangular blocks, discs or other regular geometric shapes.

5. A method according to claim 1, in which the welding comprises electrical welding.

6. A method according to claim 1, in which the molten metal comprises a brazing composition.

7. A method according to claim 6, in which the brazing composition comprises a nickel/chrome/boron alloy.

8. A method according to claim 1, further comprising, prior to the welding step, coating the surfaces of the bodies of hard facing material which are to be welded to the substrate with a thin fusible metal layer to improve welding adhesion.

9. A method according to claim 1, in which, after the welding step, the molten metal is sprayed or coated onto the substrate to fill the spaces.

10. A method according to claim 1 in which the spaces are filled with molten metal to a thickness of from 0.1 to 10 mm.

11. A method of facing a substrate, which comprises the steps of:
    (a) assembling bodies of a facing material on a perforated mat or support having a pattern of holes corresponding to the desired relative position of the bodies on the substrate;
    (b) removably affixing the perforated mat or support bearing the bodies of facing material to the substrate;
    (c) welding the plurality of bodies of facing material to the substrate;
    (d) separating the perforated mat or support from the substrate with the bodies of facing materials affixed to the substrate; and
    (e) filling the spaces around the bodies of facing material with an anchoring material.

12. A method according to claim 11, in which the mat or support is formed from a flexible electrically insulating material.

13. A method as in claim 11, in which the perforated mat or support is formed from a polyurethane rubber.

14. A method as in claim 11 in which the holes are shaped such as the bodies are an interference fit therein so that the bodies can be transported while being held within the holes in the perforated mat of support.

15. A method as in claim 11 in which the bodies are attached to the substrate whilst they are held in the desired positions by the mat.

16. A method according to claim 11, in which the substrate comprises a wear surface of a component of a drill string.

17. A method according to claim 11, in which the facing material comprises tungsten carbide.

18. A method according to claim 11, in which the facing material is in the form of rectangular blocks, discs or other regular geometric shapes.

19. A method according to claim 11, in which the welding comprises electrical welding.

20. A method according to claim 11, in which the anchoring material comprises a brazing composition.

21. A method according to claim 20, in which the brazing composition comprises a nickel/chrome/boron alloy.

22. A method according to claim 11 further comprising, prior to the welding step, coating the surfaces of the bodies of facing material which are to be welded to the substrate with a thin fusible metal layer to improve welding adhesion.

23. A method according to claim 20, in which, after the welding step, the brazing composition is sprayed or coated onto the substrate to fill the spaces.

24. A method according to claim 23 in which the spaces are filled with the brazing composition to a thickness of from 0.1 to 10 mm.

* * * * *